(12) United States Patent
Kim

(10) Patent No.: US 7,729,310 B2
(45) Date of Patent: Jun. 1, 2010

(54) METHOD FOR ALLOCATING SUB-CHANNEL IN A MOBILE COMMUNICATION SYSTEM USING ORTHOGONAL FREQUENCY DIVISION MULTIPLE ACCESS SCHEME

(75) Inventor: Yung-Soo Kim, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 834 days.

(21) Appl. No.: 11/516,866

(22) Filed: Sep. 7, 2006

(65) Prior Publication Data

US 2007/0053456 A1 Mar. 8, 2007

(30) Foreign Application Priority Data

Sep. 7, 2005 (KR) ............... 10-2005-0083264

(51) Int. Cl.
*H04W 4/00* (2009.01)
(52) U.S. Cl. .................... 370/330; 370/436
(58) Field of Classification Search ......... 370/241, 370/203, 206, 208, 328, 329, 338, 344, 431, 370/436, 478, 330, 336, 337
See application file for complete search history.

(56) References Cited

U.S. PATENT DOCUMENTS

2005/0025039 A1 2/2005 Hwang et al.
2005/0195909 A1* 9/2005 Hwang et al. ............... 375/260
2005/0201327 A1* 9/2005 Kim et al. ................... 370/329
2005/0276242 A1* 12/2005 Goto et al. .................. 370/328
2006/0009228 A1* 1/2006 Kang et al. ................. 455/450
2006/0039274 A1* 2/2006 Park et al. ................... 370/208
2007/0263735 A1* 11/2007 Tong et al. .................. 375/260

FOREIGN PATENT DOCUMENTS

KR 1020050014695 2/2005

OTHER PUBLICATIONS

Rami Lee et al., Capacity Analysis Considering Channel Resource Overhead for Mobile Internet Access (WiBro), Jun. 1, 2005.

* cited by examiner

*Primary Examiner*—Brian D Nguyen
(74) *Attorney, Agent, or Firm*—The Farrell Law Firm, LLP

(57) ABSTRACT

A method is provided for allocating sub-channels in an Orthogonal Frequency Division Multiple Access (OFDMA) mobile communication system including a plurality of cells or a plurality of sectors. The method comprises dividing a time interval preset into a band Adaptive Modulation and Coding (AMC) sub-channel region and a diversity sub-channel region, for each of the cells or sectors; and allocating band AMC sub-channels only in a preset frequency region of the full frequency band used in the OFDMA mobile communication system, in the band AMC sub-channel region.

5 Claims, 4 Drawing Sheets

METHOD FOR ALLOCATING SUB-CHANNEL IN A MOBILE COMMUNICATION SYSTEM USING ORTHOGONAL FREQUENCY DIVISION MULTIPLE ACCESS SCHEME

PRIORITY

This application claims the benefit under 35 U.S.C. §119 (a) of an application filed in the Korean Intellectual Property Office on Sep. 7, 2005 and assigned Serial No. 2005-83264, the entire contents of which are incorporated herein by reference.

BACKGROUND OF THE INVENTION

1. Field of the Invention

The present invention relates generally to a method for allocating sub-channels in a mobile communication system using an Orthogonal Frequency Division Multiple Access (OFDMA) scheme (OFDMA mobile communication system), and in particular, to a sub-channel allocation method for minimizing interference between adjacent cells or between adjacent sectors.

2. Description of the Related Art

In the $4^{th}$ generation (4G) communication system which is the next generation communication system, active research is being conducted to provide high-speed services having various Qualities of Service (QoSs) to users. Particularly, in the 4G communication system, active research is being carried out to support high-speed services capable of guaranteeing mobility and QoS for a Broadband Wireless Access (BWA) communication system such as a wireless Local Area Network (LAN) system and a wireless Metropolitan Area Network (MAN) system. The 802.16a/d communication system of the Institute of Electrical and Electronics Engineers (IEEE) and IEEE 802.16e communication system are typical 4G communication systems.

The IEEE 802.16a/d communication system and the IEEE 802.16e communication system are communication systems employing an Orthogonal Frequency Division Multiplexing (OFDM)/OFDMA scheme to support a broadband transmission network for physical channels of the wireless MAN system. The IEEE 802.16a/d communication system takes into account only the scenario in which a subscriber station (SS) is fixed, i.e. the scenario where mobility of the SS is never considered, and the single-cell architecture. Compared with the IEEE 802.16a/d communication system, the IEEE 802.16e communication system takes into account mobility of the SS for the IEEE 802.16a/d communication system, and the SS having mobility will be referred to as a mobile station (MS).

FIG. 1 is a diagram illustrating the general architecture of IEEE 802.16e communication system. With reference to FIG. 1, a description will now be made of the architecture of the IEEE 802.16e communication system.

The IEEE 802.16e communication system is a multi-cell architecture, i.e. has a cell 100 and a cell 150, and includes a base station (BS) 110 for managing cell 100, a BS 140 for managing cell 150, and a plurality of MSs 111, 113, 130, 151 and 153. Although one BS can manage a plurality of cells, it is assumed in FIG. 1 that one BS manages only one cell, for convenience. In addition, signal exchange between BSs 110 and 140 and the MSs 111, 113, 130, 151 and 153 is achieved using the OFDM/OFDMA scheme.

The IEEE 802.16e communication system uses an Inverse Fast Fourier Transform (IFFT) scheme, and also uses a plurality of sub-carriers. The IEEE 802.16e communication system uses some of the sub-carriers as pilot sub-carriers, and the other sub-carriers except for the pilot sub-carriers as data sub-carriers. In addition, the IEEE 802.16e communication system classifies the data sub-carriers into sub-channels each having a predetermined number of the data sub-carriers, and allocates the sub-channels to a plurality of users, i.e. a plurality of MSs, according to system conditions. Herein, the "sub-channel" refers to a channel having at least one sub-carrier.

In the IEEE 802.16e communication system, the sub-channels are classified into band Adaptive Modulation and Coding (AMC) sub-channels and diversity sub-channels according to their generation method. A description will now be made of the band AMC sub-channels and the diversity sub-channels.

Band AMC Sub-Channel

The full frequency band used in the IEEE 802.16e communication system is divided into a plurality of sub-bands, i.e. a plurality of bands, and at least one sub-carrier belonging to each of the plurality of bands constituting one band AMC sub-channel. The sub-carriers constituting the band AMC sub-channel are adjacent to each other. In order to allocate the band AMC sub-channels, a BS should receive channel quality information (CQI) fed back from each of its MSs for each of the plurality of bands, and allocates a band AMC sub-channel of the band capable of providing the best channel quality to each of the MSs taking into account the CQIs fed back from the MSs. In this case, the band AMC sub-channels in each band have the similar channel quality, as they are composed of adjacent sub-carriers. Therefore, the MS can apply an appropriate AMC scheme to each AMC sub-channel, thereby maximizing the transmission capacity.

As described above, the band AMC sub-channel allocation operation in the IEEE 802.16e communication system is performed independently for each of the plurality of bands. Therefore, each MS should feed back a CQI for each individual band, and the BS allocates the band AMC sub-channels taking into account the CQI of each band, fed back from each MS. The BS selects an MS having the best channel quality for each individual band, and allocates a band AMC sub-channel to the selected MS, thereby maximizing the system capacity.

Diversity Sub-Channel

The diversity sub-channel is generated such that at least one of all sub-carriers used in the IEEE 802.16e communication system is distributed over the full frequency band of the IEEE 802.16e communication system, making it possible to acquire a frequency diversity gain. Generally, a wireless channel undergoes a change in the time domain and frequency domain. In this channel environment, if it is impossible to adaptively transmit a signal according to the channel quality of a particular MS, each MS receives the transmitted signal sometimes with the good channel quality, or sometimes with the bad channel quality, so it is preferable to acquire the diversity gain. Therefore, it is preferable to allocate the diversity sub-channels. The diversity sub-channel is generated by mapping indexes of all sub-carries used in the IEEE 802.16e communication system according to a preset frequency hopping pattern or spreading sequence.

The band AMC sub-channel is suitable for transmitting a signal to a particular MS, because it is not preferable that the channel transmits to a plurality of MSs, for example, a broadcast channel or a common control information channel, adaptively transmits according to the channel quality of a particular MS. In addition, the band AMC sub-channel is suitable for transmission of the traffics, which are less susceptible to delay, for the following reason. As the band AMC sub-channel is basically allocated to the selected MSs having good channel quality, the traffics susceptible to delay, for example, the real-time traffics for Voice over Internet Protocol (VoIP) or video conference, cannot wait until the channel quality of the corresponding MS becomes good. That is, the reason is because the MSs servicing the real-time traffics should continuously provide the service to guarantee a certain delay even though the channel quality is poor. In addition, the AMC sub-channel decreases in reliability of a CQI fed back from an MS, when the moving velocity of the MS increases. Therefore, it is not preferable to allocate the AMC sub-channel to a high-velocity MS. That is, for the high-velocity MS, it is preferable to allocate the diversity sub-channel having no need for separate CQI feedback.

In addition, in the IEEE 802.16e communication system, if adjacent cells or adjacent sectors use the same frequency band, i.e. if a frequency reuse factor is 1, signal collision may occur deteriorating the reception performance. A description thereof will be made herein below.

First, the diversity sub-channel collision between adjacent cells or adjacent sectors is described.

In the IEEE 802.16e communication system, the diversity sub-channels are generated between adjacent cells or adjacent sectors according to different frequency hopping pattern or spreading sequence, to prevent the occasion where the same diversity sub-channel is used at the same unit time. However, even in this case, collision may occur between some of the sub-carriers. Although the collision occurs, the number of sub-carriers undergoing the collision is very small, so it is possible to receive a signal through collision-free sub-carriers.

Second, a description will be made of diversity sub-channel and band AMC sub-channel collision between adjacent cells or adjacent sectors.

As described above, because the diversity sub-channel is generated according to the frequency hoping pattern or spreading sequence, collision between the diversity sub-channel and the band AMC sub-channel may rarely occur. Of course, even in this case, collision between some of the sub-carriers may occur. Although the collision occurs, the number of sub-carriers undergoing the collision is very small, so it is possible to receive a signal through collision-free sub-carriers.

Third, a description will be made of band AMC sub-channel collision between adjacent cells or adjacent sectors.

Currently, in the IEEE 802.16e communication system, there is no separate scheme proposed for prevention of the band AMC sub-channel collision between the adjacent cells or adjacent sectors. Therefore, if the band AMC sub-channel collision occurs between the adjacent cells or adjacent sectors, all sub-carriers constituting the band AMC sub-channel undergo the collision, disabling signal reception. As a result, all signals should be retransmitted.

As described above, if collision occurs in the band AMC sub-channels between the adjacent cells or adjacent sectors, the signal reception is impossible, causing abrupt deterioration of the entire system performance. However, in the IEEE 802.16e communication system, because there is no separate scheme proposed for prevention of the band AMC sub-channel collision between the adjacent cells or adjacent sectors, there is a need for a band AMC sub-channel allocation scheme for collision prevention between adjacent cells or adjacent sectors. That is, there is a demand for a scheme of allocating band AMC sub-channels so as to minimize interference between adjacent cells or adjacent sectors in the IEEE 802.16e communication system using a frequency reuse factor of 1.

SUMMARY OF THE INVENTION

It is, therefore, an object of the present invention to provide a diversity sub-channel allocation method for minimizing interference between adjacent cells or adjacent sectors in an OFDMA mobile communication system.

It is another object of the present invention to provide a band AMC sub-channel allocation method for minimizing interference between adjacent cells or adjacent sectors in an OFDMA mobile communication system.

According to one aspect of the present invention, there is provided a method for allocating sub-channels in an Orthogonal Frequency Division Multiple Access (OFDMA) mobile communication system. The method includes dividing in the time domain a time interval preset into a band Adaptive Modulation and Coding (AMC) sub-channel region and a diversity sub-channel region, for each of a plurality of cells or sectors; and allocating band AMC sub-channels only in a preset frequency region of the full frequency band used in the OFDMA mobile communication system.

According to another aspect of the present invention, there is provided a method for allocating sub-channels in an Orthogonal Frequency Division Multiple Access (OFDMA) mobile communication system. The method includes dividing in the frequency domain a time interval preset into a band Adaptive Modulation and Coding (AMC) sub-channel region and a diversity sub-channel region, for each of a plurality of cells or sectors; and allocating band AMC sub-channels only in a preset frequency region of the full frequency band used in the OFDMA mobile communication system.

According to further aspect of the present invention, there is provided a method for allocating sub-channels in an Orthogonal Frequency Division Multiple Access (OFDMA) mobile communication system. The method includes dividing in the frequency domain a full frequency region used in the OFDMA mobile communication system into a band Adaptive Modulation and Coding (AMC) sub-channel region and a diversity sub-channel region, for each of a plurality of cells or sectors; and allocating band AMC sub-channels in the band AMC sub-channel region.

According to yet another aspect of the present invention, there is provided a method for allocating sub-channels in an Orthogonal Frequency Division Multiple Access (OFDMA) mobile communication system. The method includes defining a preset frequency region in a full frequency region used in the OFDMA mobile communication system in a frequency domain as a band Adaptive Modulation and Coding (AMC) sub-channel region, for each of a plurality of cells or sectors; and allocating band AMC sub-channels in the band AMC sub-channel region.

According to still another aspect of the present invention, there is provided a method for allocating sub-channels in an Orthogonal Frequency Division Multiple Access (OFDMA) mobile communication system. The method includes dividing a time interval preset in the time domain into a band Adaptive Modulation and Coding (AMC) sub-channel region and a diversity sub-channel region, for each of a plurality of cells or sectors; and allocating band AMC sub-channels in the band AMC sub-channel region.

According to still another aspect of the present invention, there is provided a method for allocating sub-channels in an Orthogonal Frequency Division Multiple Access (OFDMA) mobile communication system. The method includes defining in the time domain a second time interval in a first time interval preset as a band Adaptive Modulation and Coding (AMC) sub-channel region, for each of a plurality of cells or sectors; and allocating band AMC sub-channels in the band AMC sub-channel region.

According to still another aspect of the present invention, there is provided a method for allocating sub-channels in an Orthogonal Frequency Division Multiple Access (OFDMA) mobile communication system. The method includes dividing a time interval preset in the time domain into a band Adaptive Modulation and Coding (AMC) sub-channel region and a diversity sub-channel region, for each of a plurality of cells or sectors; and allocating band AMC sub-channels only in a preset frequency region in a full frequency region used in the OFDMA mobile communication system.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention will now be described in detail with reference to the annexed drawings. In the following description, detailed description of known functions and configurations incorporated herein has been omitted for clarity and conciseness.

The present invention provided a sub-channel allocation method for minimizing interference between adjacent cells or adjacent sectors in a mobile communication system using an Orthogonal Frequency Division Multiple Access (OFDMA) scheme (OFDMA mobile communication system), for example, an Institute of Electrical and Electronics Engineers (IEEE) 802.16e communication system. In particular, the present invention provides a method for allocating band Adaptive Modulation and Coding (AMC) sub-channels to minimize interference between adjacent cells or adjacent sectors, i.e. to minimize collision, in an OFDMA mobile communication system. Although the present invention will be described with reference to the IEEE 802.16e communication system for convenience, the sub-channel allocation method of the present invention can be applied not only to the IEEE 802.16e communication system, but also to other communication systems. In addition, although not separately illustrated, the sub-channel allocation method of the present invention is performed by a base station controller that controls BSs in the IEEE 802.16e communication system, and actually, each BS allocates sub-channels for each individual cell or each individual sector under the control of the base station controller.

In brief, the first embodiment of the present invention divides a time-domain unit time interval, for example, one frame, into time intervals where band AMC sub-channels and diversity sub-channels are allocated, i.e. divides one frame into a band AMC sub-channel region and a diversity sub-channel region, and allocates band AMC sub-channels only in a partial frequency region of the band AMC sub-channel region, in order to minimize band AMC sub-channel collision between adjacent cells or adjacent sectors. That is, the first embodiment divides one frame into a band AMC sub-channel region for allocating band AMC sub-channels and a diversity sub-channel region for allocating diversity sub-channels, and then allocates the band AMC sub-channels only in a partial frequency region of the band AMC sub-channel region and allocates only the diversity sub-channels in the diversity sub-channel region, thereby minimizing band AMC sub-channel collision between adjacent cells or adjacent sectors. Heretofore, the frequency region where each cell or each sector allocates the band AMC sub-channels in the band AMC sub-channel region should be different.

Figure 1:
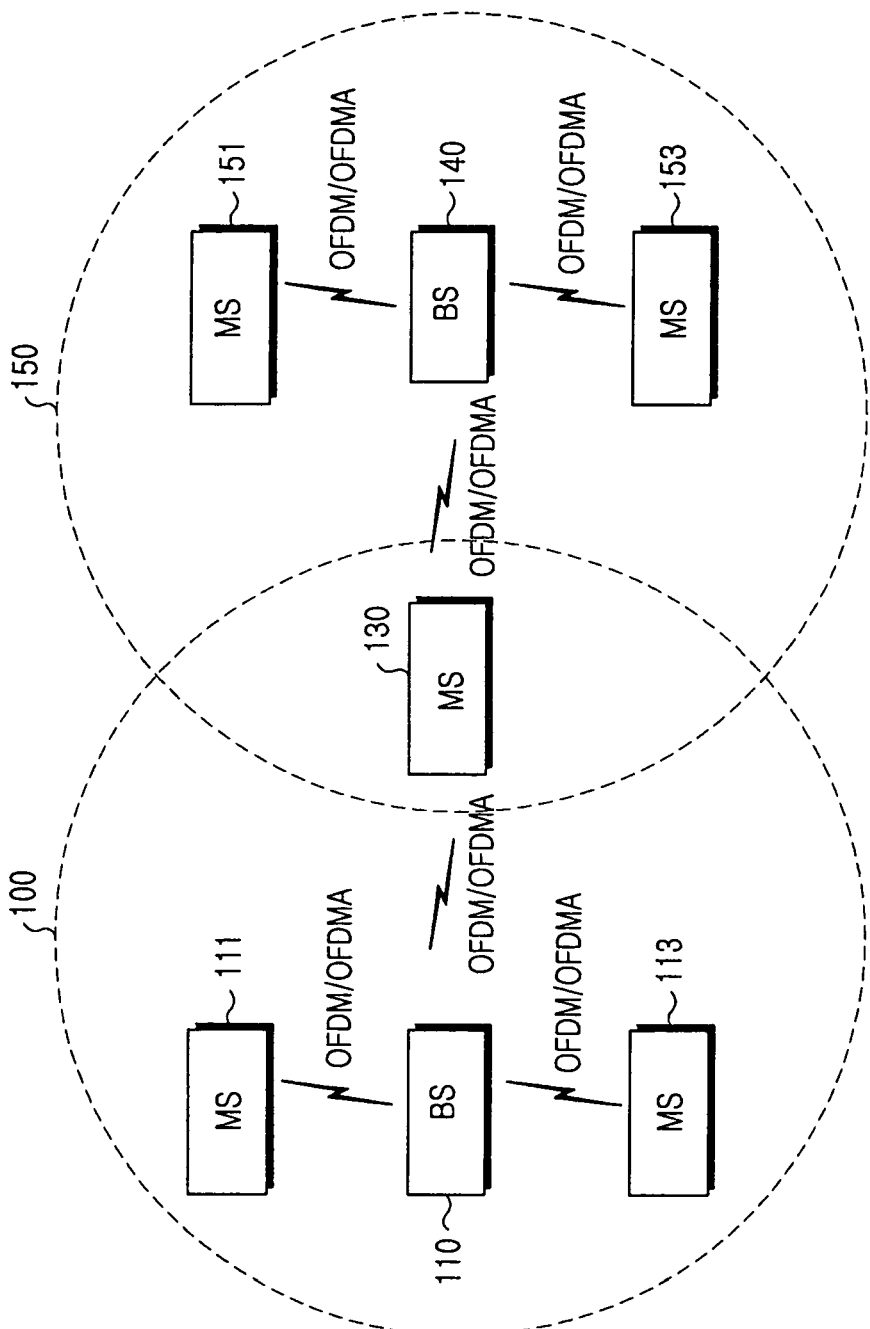
FIG. 1 is a diagram illustrating the general architecture of an IEEE 802.16e communication system.
Figure 2:
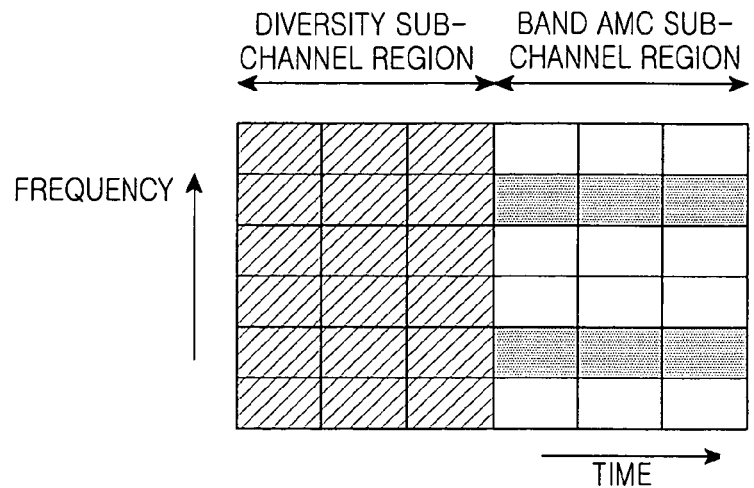
FIG. 2 is a diagram illustrating a sub-channel allocation operation in an IEEE 802.16e communication system according to a first embodiment of the present invention.

Referring to FIG. 2, adjacent cells or adjacent sectors, although they use the same frequency region, divide one frame into a diversity sub-channel region and a band AMC sub-channel region, and then allocate only the diversity sub-channels in the diversity sub-channel region and allocate only the band AMC sub-channels in a partial frequency region of the band AMC sub-channel region, thereby minimizing band AMC sub-channel collision between the adjacent cells or adjacent sectors. For example, if there are two cells, i.e.: a first cell and a second cell, the time intervals used by the first cell and the second cell as a band AMC sub-channel region are equal to each other, but frequency regions where band AMC sub-channels are actually allocated in the band AMC sub-channel region are different from each other, thus minimizing collision between the band AMC sub-channels.

Next, with reference to FIG. 3, a description will now be made of a sub-channel allocation operation in an IEEE 802.16e communication system according to a second embodiment of the present invention.

In brief, the second embodiment of the present invention divides the full frequency region of the frequency domain into frequency regions where band AMC sub-channels and diversity sub-channels are allocated, i.e. divides the full frequency region into a band AMC sub-channel region for allocating band AMC sub-channels and a diversity sub-channel region for allocating diversity sub-channels, and then allocates only the diversity sub-channels in the diversity sub-channel region and allocates the band AMC sub-channels only in a partial frequency region of the band AMC sub-channel region, in order to minimize band AMC sub-channel collision between adjacent cells or adjacent sectors. Heretofore, the frequency region where each cell or each sector allocates the band AMC sub-channels in the band AMC sub-channel region should be different.

Figure 3:
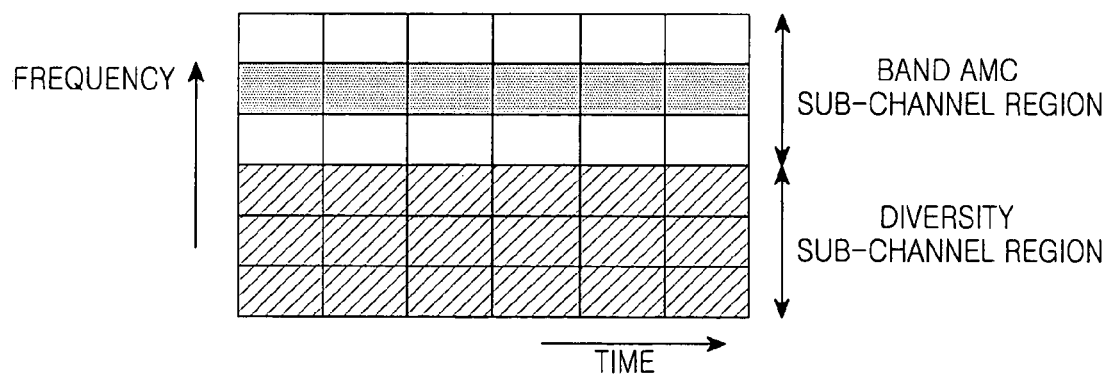
FIG. 3 is a diagram illustrating a sub-channel allocation operation in an IEEE 802.16e communication system according to a second embodiment of the present invention.

Referring to FIG. 3, adjacent cells or adjacent sectors divide the full frequency region into a diversity sub-channel region and a band AMC sub-channel region in the same time interval, and then allocate only the diversity sub-channels in the diversity sub-channel region and allocate the band AMC sub-channels only in a partial frequency region of the band AMC sub-channel region, thereby minimizing band AMC sub-channel collision between adjacent cells or adjacent sectors. For example, if there are two cells, i.e.: a first cell and a second cell, the frequency regions used by the first cell and the second cell as a band AMC sub-channel region are equal to each other, but frequency regions where band AMC sub-channels are actually allocated in the band AMC sub-channel region are different from each other, thus minimizing collision between the band AMC sub-channels.

Next, with reference to FIG. 4, a description will now be made of a sub-channel allocation operation in an IEEE 802.16e communication system according to a third embodiment of the present invention.

In brief, the third embodiment of the present invention divides the full frequency region of the frequency domain into frequency regions where band AMC sub-channels and diversity sub-channels are allocated, i.e. divides the full frequency region into a band AMC sub-channel region for allocating band AMC sub-channels and a diversity sub-channel region for allocating diversity sub-channels, and then allocates only the diversity sub-channels in the diversity sub-channel region and allocates only the band AMC sub-channels in the band AMC sub-channel region, in order to minimize band AMC sub-channel collision between adjacent cells or adjacent sectors. Heretofore, the frequency region allocated by each cell or each sector as a band AMC sub-channel region should be different, and the other frequency regions except for the frequency region allocated as the band AMC sub-channel region are allocated as diversity sub-channel regions.

Figure 4:
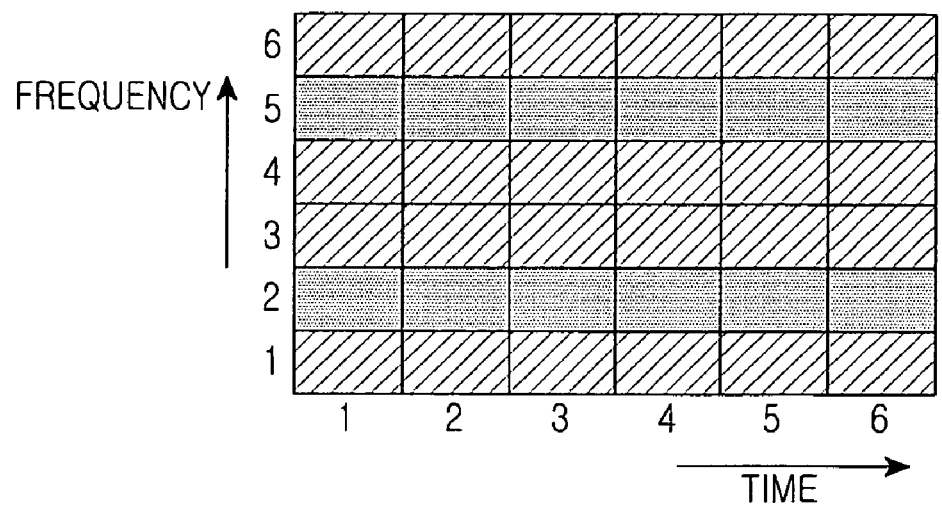
FIG. 4 is a diagram illustrating a sub-channel allocation operation in an IEEE 802.16e communication system according to a third embodiment of the present invention.

Referring to FIG. 4, adjacent cells or adjacent sectors divide the full frequency domain into diversity sub-channel regions and band AMC sub-channel regions in the same time interval, and then allocate only the diversity sub-channels in the diversity sub-channel regions and allocate band AMC sub-channels only in the band AMC sub-channel regions, thereby minimizing band AMC sub-channel collision between adjacent cells or adjacent sectors. For example, assuming three cells, i.e.: a first cell to a third cell, and the full frequency region is divided into a total of 6 frequency regions, i.e. divided into a total of 6 frequency regions with an index 1 to 6. Then, the first cell uses the frequency regions with the indexes 1 and 4 as band AMC sub-channel regions, and uses the frequency regions with the indexes 2, 3, 5 and 6 as diversity sub-channel regions. The second cell uses the frequency regions with the indexes 2 and 5 as band AMC sub-channel regions, and uses the frequency regions with the indexes 1, 3, 4 and 6 as diversity sub-channel regions. The third cell uses the frequency regions with the indexes 3 and 6 as band AMC sub-channel regions, and uses the frequency regions with the indexes 1, 2, 4 and 5 as diversity sub-channel regions. As a result, the frequency regions used by the first cell to the third cell as band AMC sub-channel regions are different, thus minimizing collision between band AMC sub-channels.

Although each cell or each sector allocates diversity sub-channels in the regions except for the region where it allocates band AMC sub-channels in the band AMC sub-channel region in the exemplary case of FIG. 4, each cell or each sector may transmit no signal in the regions except for the region where it allocates band AMC sub-channels in the band AMC sub-channel region. In this case, interference from adjacent cells or adjacent sectors is reduced as compared with the case where each cell or each sector allocates diversity sub-channels in the regions except for the region where it allocates band AMC sub-channels in the band AMC sub-channel region.

Next, with reference to FIG. 5, a description will now be made of a sub-channel allocation operation in an IEEE 802.16e communication system according to a fourth embodiment of the present invention.

In brief, the fourth embodiment of the present invention divides a time-domain unit time interval, for example, one frame, into time intervals where band AMC sub-channels and diversity sub-channels are allocated, i.e. divides one frame into a band AMC sub-channel region for allocating band AMC sub-channels and a diversity sub-channel region for allocating diversity sub-channels, and then allocates only the diversity sub-channels in the diversity sub-channel region and allocates only the band AMC sub-channels in the band AMC sub-channel region, thereby minimizing band AMC sub-channel collision between adjacent cells or adjacent sectors. Heretofore, the time interval allocated by each cell or each sector as a band AMC sub-channel region should be different, and the other time intervals except for the time interval allocated as the band AMC sub-channel region are allocated as diversity sub-channel regions.

Figure 5:
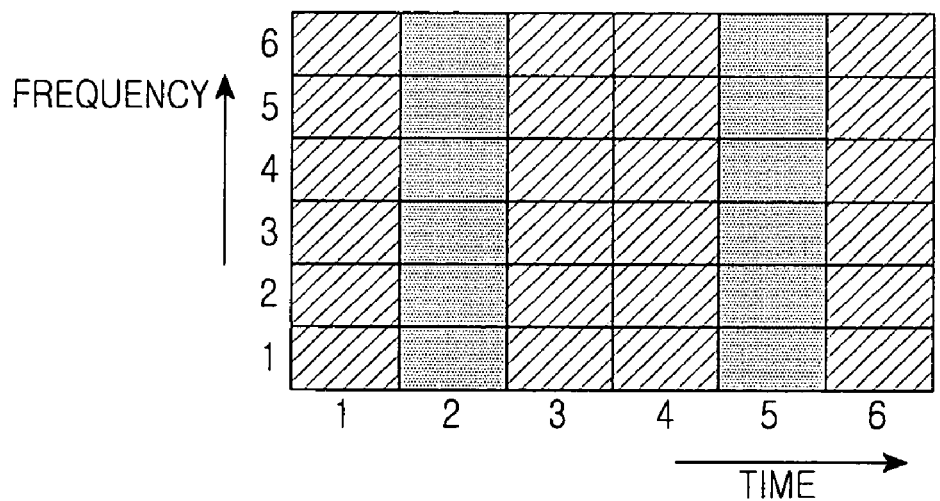
FIG. 5 is a diagram illustrating a sub-channel allocation operation in an IEEE 802.16e communication system according to a fourth embodiment of the present invention.

Referring to FIG. 5, adjacent cells or adjacent sectors divide one frame into diversity sub-channel regions and band AMC sub-channel regions, and then allocate only the diversity sub-channels in the diversity sub-channel regions and allocate band AMC sub-channels only in the band AMC sub-channel regions, thereby minimizing band AMC sub-channel collision between adjacent cells or adjacent sectors. For example, assuming there are three cells, i.e.,: a first cell to a third cell, and one frame is divided into a total of 6 time intervals, i.e. divided into a total of 6 time intervals with an index 1 to 6. Then, the first cell uses the time intervals with the indexes 1 and 4 as band AMC sub-channel regions, and uses the time intervals with the indexes 2, 3, 5 and 6 as diversity sub-channel regions. The second cell uses the time intervals with the indexes 2 and 5 as band AMC sub-channel regions, and uses the time intervals with the indexes 1, 3, 4 and 6 as diversity sub-channel regions. The third cell uses the time intervals with the indexes 3 and 6 as band AMC sub-channel regions, and uses the time intervals with the indexes 1, 2, 4 and 5 as diversity sub-channel regions. As a result, the time intervals used by the first cell to the third cell as band AMC sub-channel regions are different, thus minimizing collision between band AMC sub-channels.

Although each cell or each sector allocates diversity sub-channels in the regions except for the region where it allocates band AMC sub-channels in the band AMC sub-channel region in the exemplary case of FIG. 5, each cell or each sector may transmit no signal in the regions except for the region where it allocates band AMC sub-channels in the band AMC sub-channel region. In this case, interference from adjacent cells or adjacent sectors is reduced as compared with the case where each cell or each sector allocates diversity sub-channels in the regions except for the region where it allocates band AMC sub-channels in the band AMC sub-channel region.

Next, with reference to FIG. 6, a description will now be made of a sub-channel allocation operation in an IEEE 802.16e communication system according to a fifth embodiment of the present invention.

In brief, the fifth embodiment of the present invention divides the time-frequency domain into the regions where band AMC sub-channels and diversity sub-channels are allocated, in order to minimize band AMC sub-channel collision between adjacent cells or adjacent sectors. That is, the fifth embodiment of the present invention divides a time-domain unit time interval, for example, one frame, into time intervals where band AMC sub-channels and diversity sub-channels are allocated, i.e. divides one frame into a band AMC sub-channel region for allocating band AMC sub-channels and a diversity sub-channel region for allocating diversity sub-channels, and then allocates only the diversity sub-channels in the diversity sub-channel region and allocates only the band AMC sub-channels in the band AMC sub-channel region. In addition, the fifth embodiment of the present invention divides the full frequency region of the frequency domain into frequency regions where band AMC sub-channels and diversity sub-channels are allocated, i.e. divides the full frequency region into a band AMC sub-channel region for allocating band AMC sub-channels and a diversity sub-channel region for allocating diversity sub-channels, and then allocates only the diversity sub-channels in the diversity sub-channel region and allocates only the band AMC sub-channels in the band AMC sub-channel region, thereby minimizing band AMC sub-channel collision between adjacent cells or adjacent sectors. Herein, the time region and the frequency region allocated by each cell or each sector as a band AMC sub-channel region should be different, and the other time and frequency regions except for the time and frequency regions allocated as the band AMC sub-channel region are allocated as diversity sub-channel regions. The fifth embodiment of the present invention allocates band AMC sub-channels taking into account both the time domain and the frequency domain, so it can freely allocate the band AMC sub-channels.

Figure 6:
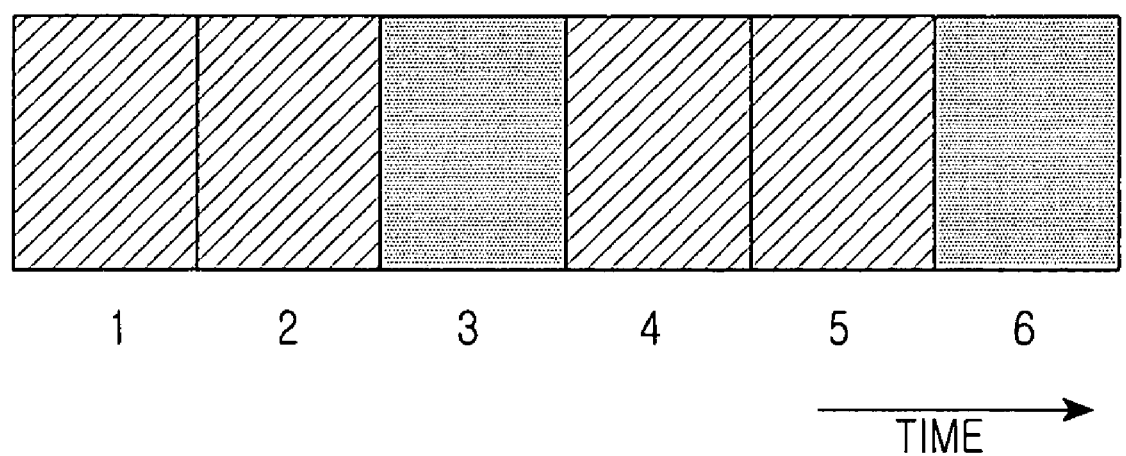
FIG. 6 is a diagram illustrating a sub-channel allocation operation in an IEEE 802.16e communication system according to a fifth embodiment of the present invention.

Although each cell or each sector allocates diversity sub-channels in the regions except for the region where it allocates band AMC sub-channels in the band AMC sub-channel region in the exemplary case of FIG. 6, each cell or each sector may transmit no signal in the regions except for the region where it allocates band AMC sub-channels in the band AMC sub-channel region. In this case, interference from adjacent cells or adjacent sectors is reduced as compared with the case where each cell or each sector allocates diversity sub-channels in the regions except for the region where it allocates band AMC sub-channels in the band AMC sub-channel region.

As can be understood from the foregoing description, the OFDMA mobile communication system according to the present invention allocates band AMC sub-channels so as to minimize collision between adjacent cells or adjacent sectors, thereby preventing the system performance deterioration due to band AMC sub-channel collision.

While the invention has been shown and described with reference to a certain preferred embodiment thereof, it will be understood by those skilled in the art that various modifications may be made therein without departing from the spirit and scope of the invention as further defined by the appended claims.

What is claimed is:

1. A method for allocating sub-channels by a base station in an Orthogonal Frequency Division Multiple Access (OFDMA) mobile communication system, the method comprising:

dividing, by the base station, a time interval preset in a time domain into a band Adaptive Modulation and Coding (AMC) sub-channel region and a diversity sub-channel region, for each of a plurality of cells or sectors; and allocating, by the base station, band AMC sub-channels in the band AMC sub-channel region, wherein dividing the time interval comprises dividing the preset time interval into the band AMC sub-channel region and the diversity sub-channel region such that the time interval of the band AMC sub-channel region used by each of the plurality of cells or sectors is different.

2. The method of claim 1, further comprising allocating, by the base station, diversity sub-channels in the diversity sub-channel region.

3. A method for allocating sub-channels by a base station in an Orthogonal Frequency Division Multiple Access (OFDMA) mobile communication system, the method comprising:

defining, by the base station, a second time interval in a first time interval preset in a time domain as a band Adaptive Modulation and Coding (AMC) sub-channel region, for each of a plurality of cells or sectors; and allocating, by the base station, band AMC sub-channels in the band AMC sub-channel region, wherein defining the second time interval comprises defining the second time interval as the band AMC sub-channel region such that the time interval of the band AMC sub-channel used by each of the plurality of cells or sectors is different.

4. The method of claim 3, further comprising transmitting, by the base station, no signal in other regions except for the band AMC sub-channel region.

5. A method for allocating sub-channels by a base station in an Orthogonal Frequency Division Multiple Access (OFDMA) mobile communication system, the method comprising:

dividing, by the base station a time interval preset in a time domain into a band Adaptive Modulation and Coding (AMC) sub-channel region and a diversity sub-channel region for each of a plurality of cells or sectors; and allocating, by the base station, band AMC sub-channels only in a preset frequency region in a full frequency region used in the OFDMA mobile communication system in the band AMC sub-channel region, wherein dividing the time interval comprises dividing the preset time interval into the band AMC sub-channel region and the diversity sub-channel region such that the time interval of the band AMC sub-channel region used by each of the plurality of cells or sectors is different.

\* \* \* \* \*